(12) United States Patent
Kubota et al.

(10) Patent No.: US 10,960,758 B2
(45) Date of Patent: Mar. 30, 2021

(54) POWER TRAIN AND CONSTRUCTION MACHINE

(71) Applicant: KOMATSU LTD., Tokyo (JP)

(72) Inventors: Teruya Kubota, Tokyo (JP); Ryutaro Kamachi, Tokyo (JP)

(73) Assignee: KOMATSU LTD., Tokyo (JP)

( * ) Notice: Subject to any disclaimer, the term of this patent is extended or adjusted under 35 U.S.C. 154(b) by 42 days.

(21) Appl. No.: 16/472,378

(22) PCT Filed: Mar. 26, 2018

(86) PCT No.: PCT/JP2018/012094
§ 371 (c)(1),
(2) Date: Jun. 21, 2019

(87) PCT Pub. No.: WO2018/181153
PCT Pub. Date: Oct. 4, 2018

(65) Prior Publication Data
US 2019/0366840 A1   Dec. 5, 2019

(30) Foreign Application Priority Data

Mar. 30, 2017   (JP) .............................. JP2017-067377

(51) Int. Cl.
| | | |
|---|---|---|
| *B60K 17/04* | (2006.01) | |
| *B60K 7/00* | (2006.01) | |
| *B60K 17/356* | (2006.01) | |
| *F16H 3/44* | (2006.01) | |
| *B60K 17/02* | (2006.01) | |
| *F16D 25/10* | (2006.01) | |

(Continued)

(52) U.S. Cl.
CPC .......... *B60K 17/046* (2013.01); *B60K 7/0015* (2013.01); *B60K 17/356* (2013.01); *F16H 3/44* (2013.01); *B60K 17/02* (2013.01); *B60Y 2200/41* (2013.01); *F16D 25/10* (2013.01); *F16H 57/10* (2013.01); *F16H 2057/087* (2013.01); *F16H 2200/2097* (2013.01)

(58) Field of Classification Search
None
See application file for complete search history.

(56) References Cited

U.S. PATENT DOCUMENTS 5,472,062 A    12/1995  Nagai et al.
5,558,595 A *   9/1996  Schmidt ................ B60W 10/08
                                                  477/3

(Continued)

FOREIGN PATENT DOCUMENTS

JP       2914397 B2     6/1999
JP       3367614 B2     1/2003
(Continued)

*Primary Examiner* — Colby M Hansen
(74) *Attorney, Agent, or Firm* — Faegre Drinker Biddle & Reath LLP

(57) ABSTRACT

A first planetary gear set includes a first sun gear to which power is input from a hydraulic motor. The first planetary gear set includes a first carrier and a first ring gear. The first carrier and the first ring gear are able to rotate in conjunction with rotation of the first sun gear. A second planetary gear set includes a second sun gear configured so as to rotate integrally with the first carrier. A hydraulic clutch mechanism allows or prohibits the rotation of the first ring gear.

6 Claims, 3 Drawing Sheets

(51) Int. Cl.
*F16H 57/10* (2006.01)
*F16H 57/08* (2006.01)

(56) References Cited

U.S. PATENT DOCUMENTS

| | | |
|---|---|---|
| 5,848,664 A | 12/1998 | Kaspar |
| 6,491,600 B1 | 12/2002 | Smemo et al. |
| 2005/0049107 A1* | 3/2005 | Willmot .................. F16H 3/721 475/339 |
| 2012/0149525 A1 | 6/2012 | Gumpoltsberger et al. |
| 2012/0202640 A1 | 8/2012 | Morimoto |
| 2014/0051537 A1* | 2/2014 | Liu ........................... F16H 3/72 475/5 |
| 2016/0146310 A1 | 5/2016 | Naito |
| 2018/0149240 A1 | 5/2018 | Kubota |

FOREIGN PATENT DOCUMENTS

| | | |
|---|---|---|
| JP | 2011-106611 A | 6/2011 |
| JP | 2013-502544 A | 1/2013 |
| JP | 5689162 B1 | 3/2015 |
| JP | 2016-211638 A | 12/2016 |

\* cited by examiner

POWER TRAIN AND CONSTRUCTION MACHINE

TECHNICAL FIELD

The present disclosure relates to a power train and a construction machine including the power train.

BACKGROUND ART

In recent years, machines such as motor graders may be provided with an all-wheel drive device for driving all of the front and rear wheels. Such an all-wheel drive device transfers the engine output to the rear wheels through a transmission so as to drive the rear wheels, and also transfers the engine output to hydraulic pumps so as to drive the right and left front wheels using a pair of hydraulic motors rotating with the discharged oil from the hydraulic pumps.

U.S. Pat. No. 6,491,600 (PTL 1) discloses an apparatus in which: a torque from a motor is inputted to a sun gear of a first stage planetary gear mechanism, a first stage carrier is coupled to a sun gear of a second stage planetary gear mechanism, a first stage ring gear and a second stage carrier are coupled to a wheel, and a second stage ring gear is coupled to a stationary housing via a clutch mechanism.

CITATION LIST

Patent Literature

PTL 1: U.S. Pat. No. 6,491,600

SUMMARY OF INVENTION

Technical Problem

In the apparatus described in PTL 1, the clutch mechanism receives a large torque. The clutch mechanism thus needs a large-sized clutch having many clutch plates. Therefore, it is difficult to reduce the weight of the apparatus.

The present disclosure provides a power train having a reduced weight, and a motor grader including the power train.

Solution to Problem

According to the present disclosure, provided is a power train including a drive source, a first planetary gear set, a second planetary gear set, and a clutch. The first planetary gear set includes a first rotatable element configured to receive power inputted from the drive source. The first planetary gear set includes a second rotatable element and a third rotatable element. The second rotatable element and the third rotatable element are rotatable with rotation of the first rotatable element. The second planetary gear set includes a fourth rotatable element configured to rotate integrally with the second rotatable element. The clutch is configured to permit or prohibit rotation of the third rotatable element.

Advantageous Effects of Invention

A power train according to the present disclosure can be reduced in weight.

DESCRIPTION OF EMBODIMENTS

An embodiment of a power train is hereinafter described with reference to the drawings. Identical and corresponding components are identically denoted, and the redundant explanation may not be repeated.

A configuration of a motor grader is described as an example of a construction machine to which a power train according to an embodiment is applicable. The power train according to an embodiment, however, is applicable to various other types of apparatuses, such as construction machines or vehicles, including a power train switchable between "on" and "off" in drive.

Figure 1:
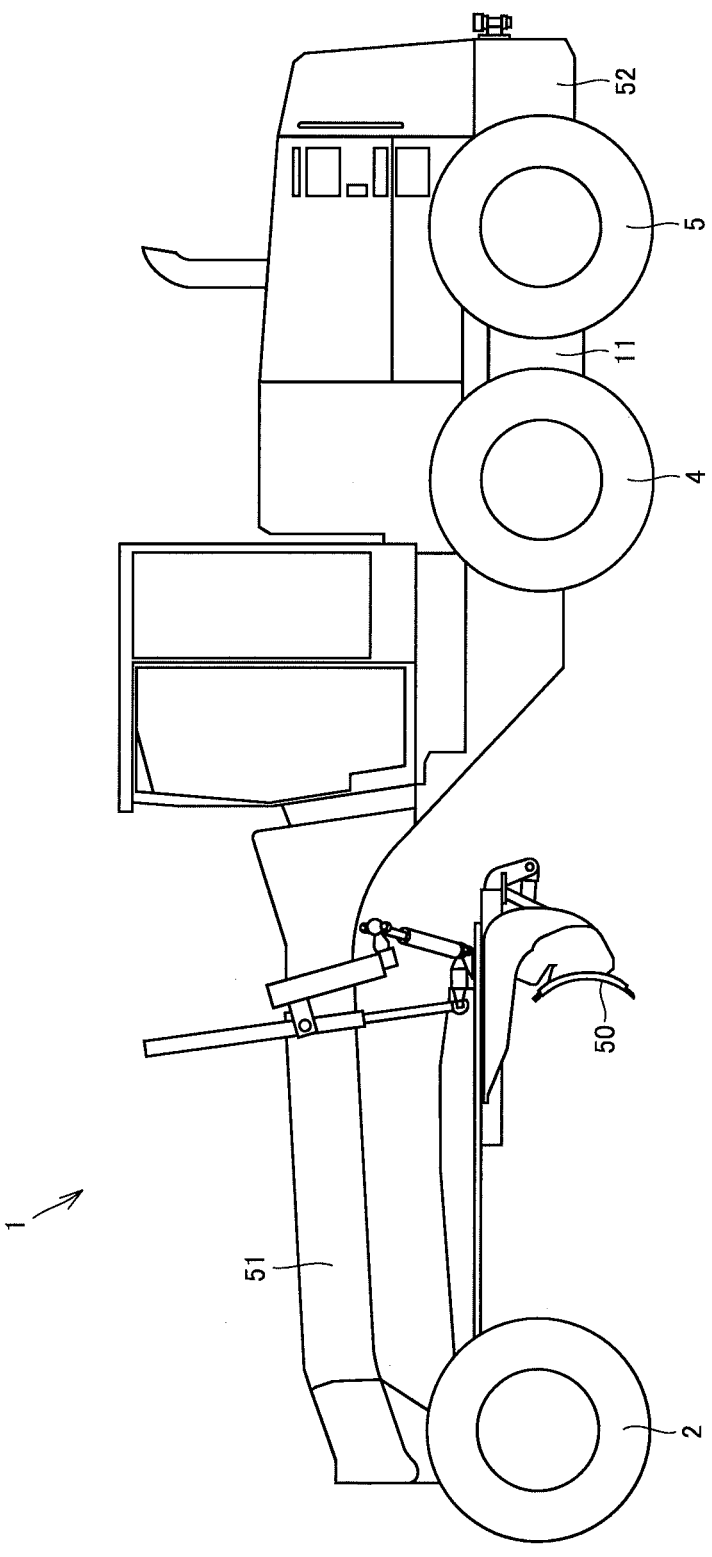
FIG. 1 is a side view schematically showing a configuration of a motor grader in an embodiment.

FIG. 1 is a side view schematically showing a configuration of a motor grader 1 in an embodiment. As shown in FIG. 1, motor grader 1 in the present embodiment is a vehicle having six wheels in total. Motor grader 1 has travel wheels consisting of a pair of right and left front wheels and two pairs of right and left rear wheels. The front wheels include a left front wheel 2, and a right front wheel (not shown in FIG. 1). The rear wheels include a front-left rear wheel 4, a rear-left rear wheel 5, a front-right rear wheel (not shown in FIG. 1), and a rear-right rear wheel (not shown in FIG. 1). The number and the arrangement of the front and rear wheels are not limited to the example shown in FIG. 1.

Motor grader 1 includes a blade 50. Blade 50 is disposed between the front wheels and the rear wheels. Motor grader 1 uses blade 50 to perform works, such as ground leveling, snow removal, light cutting, and mixing of ingredients.

Motor grader 1 includes a body frame. The body frame includes a front frame 51 and a rear frame 52. Front frame 51 is pivotably coupled to rear frame 52.

The front wheels and blade 50 are provided on front frame 51. The front wheels are rotatably fitted to the front end of front frame 51. The rear wheels are provided on rear frame 52. The rear wheels are fitted to rear frame 52 to be rotatably driven by a driving force from an engine, as described later.

Figure 2:
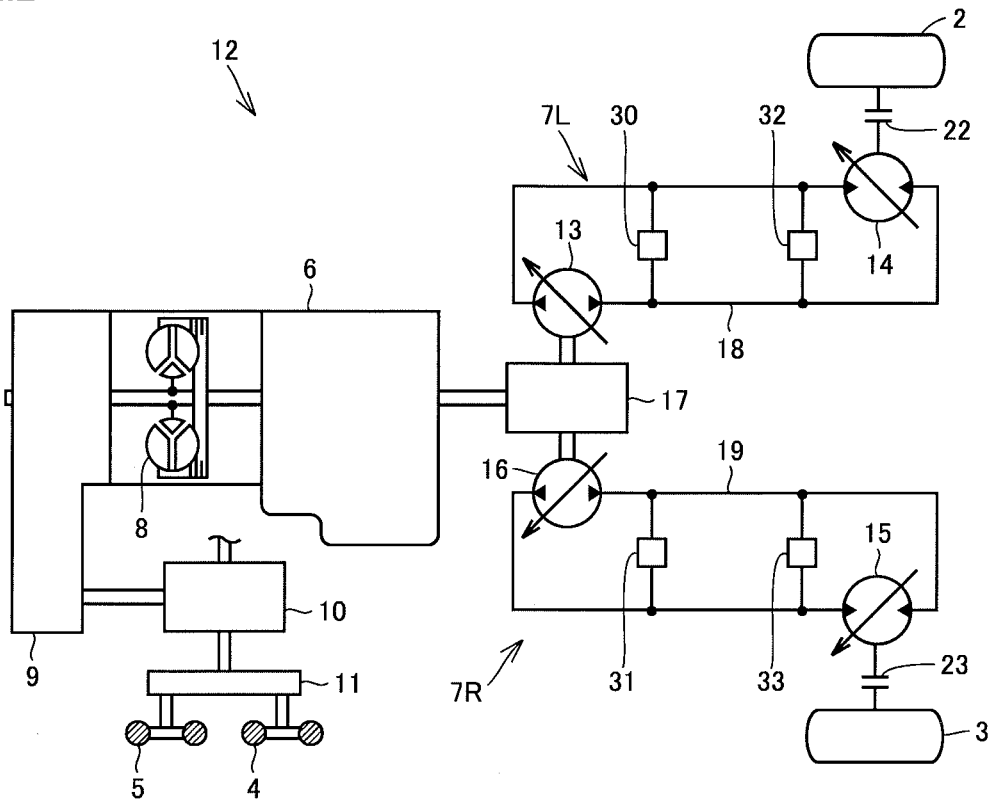
FIG. 2 is a configuration diagram showing a schematic configuration of the motor grader shown in FIG. 1.

FIG. 2 is a configuration diagram showing a schematic configuration of motor grader 1 shown in FIG. 1. A pair of right and left front wheels described above includes left front wheel 2 and right front wheel 3. Motor grader 1 includes an engine 6. Engine 6 is supported by rear frame 52 shown in FIG. 1.

To one output side of engine 6, hydraulic systems 7L, 7R are connected. Hydraulic system 7L drives left front wheel 2. Hydraulic system 7R drives right front wheel 3. To the other output side of engine 6, left rear wheels 4, 5 and the right rear wheels paired with left rear wheels 4, 5 are connected via a torque converter 8, a transmission 9, a final reduction gear 10, and a tandem device 11. Engine 6 drives left rear wheels 4, 5 and the right rear wheels via torque converter 8, transmission 9, final reduction gear 10, and tandem device 11.

Motor grader 1 is an all-wheel drive vehicle in which front wheels 2, 3, left rear wheels 4, 5, and the right rear wheels are all driven by the devices 6 to 11 for power generation and transfer. The devices 6 to 11 constitute an all-wheel drive device 12. Most parts of all-wheel drive device 12 (engine 6, a part of hydraulic systems 7L, 7R, torque converter 8, transmission 9, and final reduction gear 10) are supported by rear frame 52.

Hydraulic system 7L includes a left hydraulic pump 13 and a left hydraulic motor 14. Hydraulic system 7R includes a right hydraulic pump 16 and a right hydraulic motor 15. Left hydraulic pump 13 and right hydraulic pump 16 are driven by the output of engine 6 transferred through a power take-off (PTO) 17. Left hydraulic motor 14 rotates with hydraulic oil discharged from left hydraulic pump 13 so as to drive left front wheel 2. Right hydraulic motor 15 rotates with hydraulic oil discharged from right hydraulic pump 16 so as to drive right front wheel 3. In the present embodiment, hydraulic motors 14, 15 are bent axis motors.

Left hydraulic pump 13 and left hydraulic motor 14 are connected to each other with a left hydraulic circuit 18. The hydraulic oil discharged from left hydraulic pump 13 is supplied to left hydraulic motor 14 through left hydraulic circuit 18. When left front wheel 2 is driven, its rotation speed is controlled through the hydraulic oil discharged from left hydraulic pump 13.

Right hydraulic pump 16 and right hydraulic motor 15 are connected to each other with a right hydraulic circuit 19. The hydraulic oil discharged from right hydraulic pump 16 is supplied to right hydraulic motor 15 through right hydraulic circuit 19. When right front wheel 3 is driven, its rotation speed is controlled through the hydraulic oil discharged from right hydraulic pump 16.

A left hydraulic clutch mechanism 22 is provided between left front wheel 2 and left hydraulic motor 14. A right hydraulic clutch mechanism 23 is provided between right front wheel 3 and right hydraulic motor 15. When an oil pressure is supplied to left hydraulic clutch mechanism 22 and right hydraulic clutch mechanism 23, the power is transferred to left front wheel 2 and right front wheel 3, thus allowing motor grader 1 to perform all-wheel drive. When supply of oil pressure to left hydraulic clutch mechanism 22 and right hydraulic clutch mechanism 23 is blocked, motor grader 1 stops all-wheel drive and performs rear-wheel drive.

Figure 3:
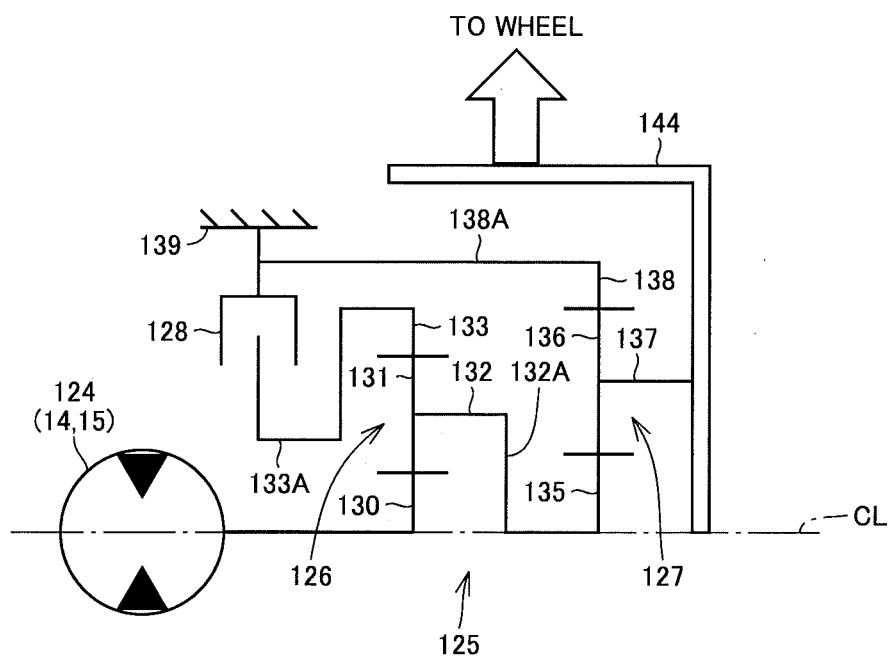
FIG. 3 is a schematic diagram of a power train in an embodiment.

FIG. 3 is a schematic diagram of a power train 125 in an embodiment. Power train 125 is a device for transferring power from a hydraulic motor 124 as a drive source (corresponding to hydraulic motors 14, 15 shown in FIG. 2) to a wheel (corresponding to front wheels 2, 3 shown in FIG. 2).

Power train 125 includes a first planetary gear set 126, a second planetary gear set 127, and a hydraulic clutch mechanism 128 (corresponding to hydraulic clutch mechanisms 22, 23 shown in FIG. 2). Of the two planetary gear sets, first planetary gear set 126 is disposed on the upstream side in the power transmission path from hydraulic motor 124 to the wheel, and second planetary gear set 127 is disposed on the downstream side in the power transmission path. The dot-and-dash line shown in FIG. 3 represents the central line CL which is the center of rotation of the rotating objects included in power train 125.

First planetary gear set 126 includes a plurality of rotatable elements. The plurality of rotatable elements of the first planetary gear set include a first sun gear 130, a plurality of first planetary gears 131, a first carrier 132, and a first ring gear 133. Second planetary gear set 127 includes a plurality of rotatable elements. The plurality of rotatable elements of the second planetary gear set include a second sun gear 135, a plurality of second planetary gears 136, a second carrier 137, and a second ring gear 138.

In power train 125, a torque from hydraulic motor 124 is inputted to first sun gear 130. In power train 125, first sun gear 130 constitutes a first rotatable element to receive power transferred from hydraulic motor 124. First carrier 132 constitutes a second rotatable element rotatable with rotation of first sun gear 130.

First ring gear 133 constitutes a third rotatable element rotatable with rotation of first sun gear 130. First ring gear 133 is coupled to a coupling portion 133A. Coupling portion 133A is coupled to a stationary housing 139 via hydraulic clutch mechanism 128. First ring gear 133 is coupled to stationary housing 139 via coupling portion 133A and hydraulic clutch mechanism 128.

In an engaged state, hydraulic clutch mechanism 128 couples first ring gear 133 to stationary housing 139, thereby braking rotation of first ring gear 133. That is, first ring gear 133 is not allowed to rotate. In a non-engaged state, hydraulic clutch mechanism 128 does not couple first ring gear 133 to stationary housing 139, thereby permitting rotation of first ring gear 133.

First carrier 132 is coupled to second sun gear 135 via a coupling portion 132A. In power train 125, second sun gear 135 constitutes a fourth rotatable element configured to rotate integrally with first carrier 132. Second ring gear 138 is coupled to a coupling portion 138A. Coupling portion 138A is coupled to stationary housing 139. Second ring gear 138 is coupled to stationary housing 139 via coupling portion 138A.

Second carrier 137 is coupled to a rotatable housing 144. Rotatable housing 144 is configured to rotate integrally with second carrier 137. Rotatable housing 144 is coupled to the wheel. Second carrier 137 is coupled to the wheel via rotatable housing 144.

Figure 4:
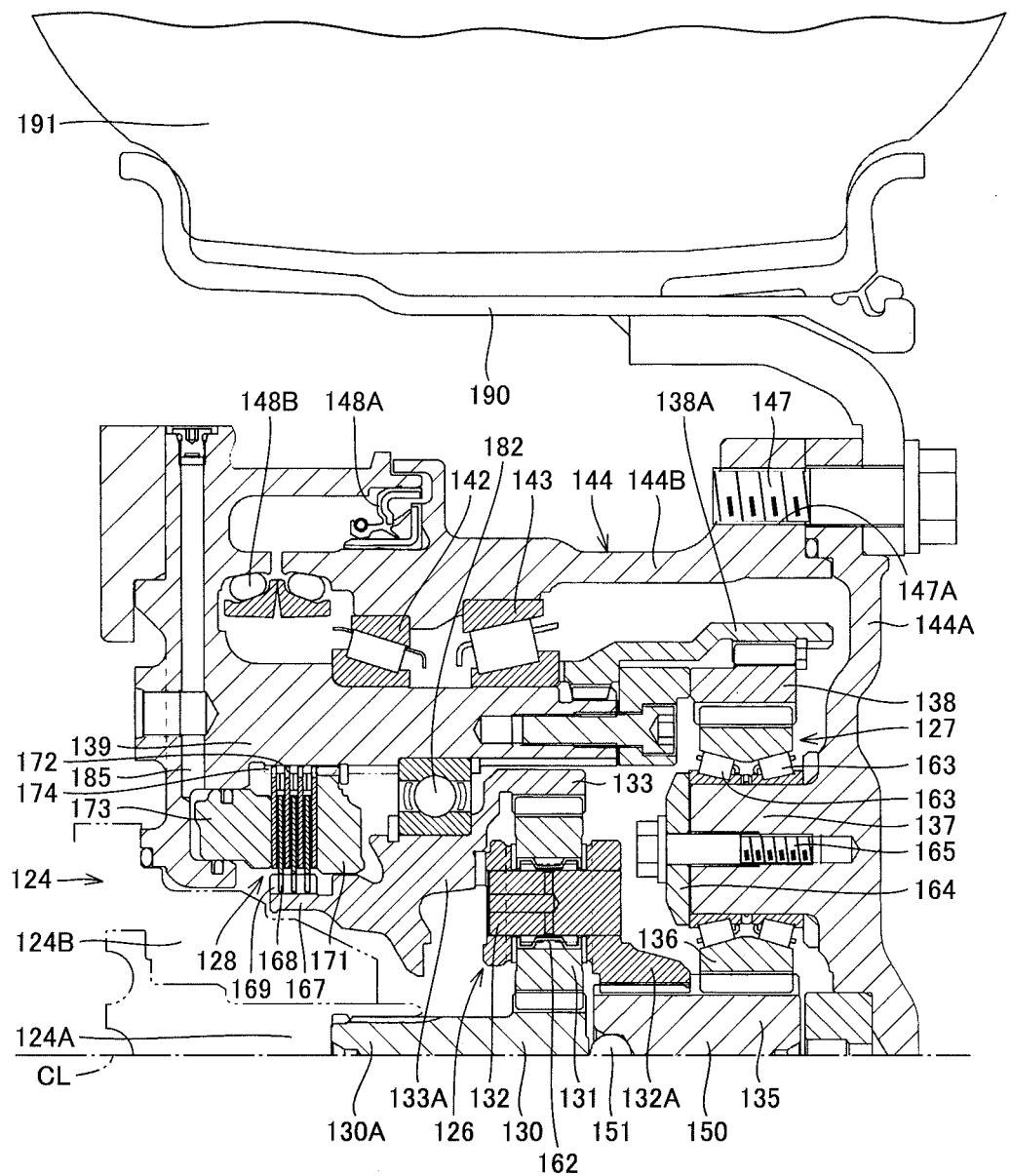
FIG. 4 is a cross-sectional configuration diagram of a power train in an embodiment.

FIG. 4 is a cross-sectional configuration diagram of power train 125 in an embodiment. As shown in FIG. 4, hydraulic motor 124 is contained in stationary housing 139 on the vehicle-body inner side (the left side in FIG. 4). Hydraulic motor 124 includes an output shaft 124A and a main body 124B. Output shaft 124A has a blind hole whose inner periphery has spline grooves. Input shaft 130A has spline teeth on the outer periphery of the proximal end of input shaft 130A. Input shaft 130A is spline-fitted in the blind hole on output shaft 124A and is thus attached to output shaft 124A. Output shaft 124A protrudes from main body 124B to the vehicle-body outer side (the right side in FIG. 4). Input shaft 130A protrudes from output shaft 124A to the vehicle-body outer side (the right side in FIG. 4).

Input shaft 130A can be rotated by the driving force generated by hydraulic motor 124. The dot-and-dash line shown in FIG. 4 represents central line CL which is the center of rotation of the rotating objects, such as output shaft 124A of hydraulic motor 124, as in FIG. 3. Input shaft 130A is disposed coaxially with the rotating shaft of the wheel.

Stationary housing 139 also contains first planetary gear set 126 and hydraulic clutch mechanism 128 therein.

Power train 125 includes rotatable housing 144. Rotatable housing 144 contains second planetary gear set 127 therein. First planetary gear set 126 and second planetary gear set 127 are aligned in the axial direction of output shaft 124A (the direction in which central line CL extends, i.e., the right-left direction in FIG. 4). Rotatable housing 144 is rotatable relative to stationary housing 139 about central line CL. Rotatable housing 144 has a bowl shape open toward stationary housing 139.

Rotatable housing 144 includes a first case portion 144A and a second case portion 144B. First case portion 144A is substantially disk-shaped and forms the bottom of the bowl shape. Second case portion 144B has a ring shape and forms the lateral of the bowl shape. First case portion 144A and second case portion 144B are coupled to each other, thus forming a bowl shape.

Between rotatable housing 144 (second case portion 144B) and stationary housing 139, an oil seal 148A and a floating seal 148B are provided. Oil seal 148A and floating seal 148B are for preventing leakage of oil from rotatable housing 144.

Rotatable housing 144 has a screw portion 147A. A wheel 190 (front wheels 2, 3 shown in FIG. 2) is attached to rotatable housing 144 with a bolt 147. Wheel 190 is fitted with a rubber tire 191.

Two wheel bearings 142, 143 are disposed between stationary housing 139 and second case portion 144B of rotatable housing 144 in the radial direction (the radial direction of the rotating objects such as output shaft 124A, i.e., the up-down direction in FIG. 4). Rotatable housing 144 and wheel 190 are rotatably supported by stationary housing 139 via two wheel bearings 142, 143.

As shown in FIG. 4, first planetary gear set 126 is disposed closer to hydraulic motor 124 than second planetary gear set 127 is to hydraulic motor 124. First planetary gear set 126 is disposed on the vehicle-body inner side relative to second planetary gear set 127. First planetary gear set 126 includes first sun gear 130, first planetary gears 131, first carrier 132, and first ring gear 133.

First sun gear 130 is formed integrally with input shaft 130A. First sun gear 130 is formed at an end of input shaft 130A. First sun gear 130 is formed at the end of input shaft 130A on the vehicle-body outer side. First sun gear 130 is rotatable integrally with input shaft 130A. First sun gear 130 may be coupled to input shaft 130A.

A plurality of first planetary gears 131 are rotatably supported by first carrier 132 and are engaged with first sun gear 130. Each of first planetary gears 131 is rotatably disposed on first carrier 132 via a bearing 162. First carrier 132 has axially-protruding coupling portion 132A on its inner periphery on the vehicle-body outer side. Coupling portion 132A has a plurality of spline teeth on the inner periphery thereof. First ring gear 133 is engaged with a plurality of first planetary gears 131. First ring gear 133 is located on the radially inner side relative to stationary housing 139.

A connecting shaft 150 is provided coaxially with input shaft 130A. Connecting shaft 150 is rotatable about central line CL. Connecting shaft 150 is disposed on the vehicle-body outer side relative to input shaft 130A. The end face of input shaft 130A on the vehicle-body outer side and the end face of connecting shaft 150 on the vehicle-body inner side face each other. Between the end face of input shaft 130A on the vehicle-body outer side and the end face of connecting shaft 150 on the vehicle-body inner side, a ball 151 is provided.

Connecting shaft 150 has spline grooves on the outer periphery thereof, near the end of connecting shaft 150 on the vehicle-body inner side. The spline teeth on coupling portion 132A are fitted in the spline grooves of connecting shaft 150, so that coupling portion 132A and connecting shaft 150 are integrally rotatably coupled to each other.

Second planetary gear set 127 is disposed remoter from hydraulic motor 124 than first planetary gear set 126 is from hydraulic motor 124. Second planetary gear set 127 is disposed on the vehicle-body outer side relative to first planetary gear set 126. Second planetary gear set 127 includes second sun gear 135, second planetary gears 136, second carrier 137, and second ring gear 138.

Second sun gear 135 is formed integrally with connecting shaft 150. Second sun gear 135 is formed at the end of connecting shaft 150 on the vehicle-body outer side. Second sun gear 135 is rotatable integrally with connecting shaft 150. Second sun gear 135 may be coupled to connecting shaft 150.

A plurality of second planetary gears 136 are rotatably supported by second carrier 137 and are engaged with second sun gear 135. Each of second planetary gears 136 is rotatably disposed on second carrier 137 via two bearings 163. The end face of second carrier 137 on the vehicle-body inner side has a support plate 164 for supporting bearings 163. Support plate 164 is fixed to second carrier 137 with a bolt 165.

Second ring gear 138 has gear teeth on the inner periphery thereof, and the gear teeth are engaged with a plurality of second planetary gears 136. Second ring gear 138 has a plurality of spline teeth on the outer periphery thereof, and the spline teeth are engaged with a plurality of spline grooves on the inner periphery of coupling portion 138A. On the vehicle-body outer side relative to second ring gear 138, provided is a snap ring for limiting a movement of second ring gear 138 toward the vehicle-body outer side. Coupling portion 138A is fixed to stationary housing 139. Thus, second ring gear 138 is fixed to stationary housing 139 via coupling portion 138A. Second ring gear 138 has a larger diameter than first ring gear 133.

Hydraulic clutch mechanism 128 is a mechanism that prohibits rotation of first ring gear 133 about central line CL (i.e., transfers power) in an on-state, and permits rotation of first ring gear 133 (i.e., stops the transfer) in an off-state.

As shown in FIG. 4, hydraulic clutch mechanism 128 is constituted of a rotatable portion and a stationary portion. The rotatable portion includes a clutch input portion 167 and a plurality of (three in this example) clutch plates 168. Clutch input portion 167 is coupled to coupling portion 133A coupled to first ring gear 133 and is rotatable along with first ring gear 133. Between the outer periphery of coupling portion 133A and the inner periphery of stationary housing 139, a bearing 182 is provided. Coupling portion 133A is rotatably supported by stationary housing 139 via bearing 182.

A plurality of clutch plates 168 each have a ring shape. Clutch input portion 167 has an engagement portion 169 on the outer periphery thereof. Each clutch plate 168 has an engagement portion on the inner periphery thereof, the engagement portion being configured to engage with engagement portion 169. Each clutch plate 168 has a friction material attached to its both faces. Clutch plates 168 are rotatable along with first ring gear 133 and are axially movable along engagement portion 169 of clutch input portion 167.

The stationary portion of hydraulic clutch mechanism 128 includes a pressure plate 171, a plurality of (four in this example) stationary plates 172, and a piston 173. The stationary portion is attached non-rotatably to stationary housing 139.

A plurality of stationary plates 172 each have a ring shape. Stationary housing 139 has an engagement portion 174 on the inner periphery thereof. Each stationary plate 172 has an engagement portion on the outer periphery thereof, the engagement portion being configured to engage with engagement portion 174. Stationary plates 172 are thus attached to stationary housing 139 non-rotatably and axially-movably relative to stationary housing 139.

Hydraulic clutch mechanism 128 is disposed on the radially inner side relative to stationary housing 139. Wheel bearings 142, 143 described above are disposed on the radially outer side relative to stationary housing 139. Hydraulic clutch mechanism 128 is disposed on the radially inner side relative to wheel bearings 142, 143.

Hydraulic clutch mechanism 128 is disposed on the radially outer side relative to clutch input portion 167. A part of clutch input portion 167 to which hydraulic clutch mechanism 128 is attached has a substantially cylindrical shape. The inner periphery of the part of clutch input portion 167 faces main body 124B of hydraulic motor 124. Hydraulic clutch mechanism 128 is disposed on the radially outer side relative to main body 124B of hydraulic motor 124.

Pressure plate 171 has a ring shape. Pressure plate 171 is disposed between stationary housing 139 and coupling portion 133A in the radial direction. Pressure plate 171 has an engagement portion on the outer periphery thereof, the engagement portion being configured to engage with engagement portion 174. On the vehicle-body outer side relative to pressure plate 171, provided is a snap ring for limiting a movement of pressure plate 171 toward the vehicle-body outer side.

Clutch plates 168 and stationary plates 172 are alternately disposed in the axial direction along central line CL. Piston 173 is disposed on the vehicle-body inner side, and pressure plate 171 is disposed on the vehicle-body outer side, relative to the assembly of alternate clutch plates 168 and stationary plates 172. Clutch plates 168 and stationary plates 172 are configured to be in pressure contact between piston 173 and pressure plate 171.

In hydraulic clutch mechanism 128, the clutch is switched between "on" and "off" by actuating piston 173. When the clutch is "on" (the brake is "on"), the rotatable portion of hydraulic clutch mechanism 128 is fixed and prohibited from rotating. When the clutch is "off" (the brake is "off"), the rotatable portion of hydraulic clutch mechanism 128 is released and permitted to rotate.

Piston 173 is actuated by the oil pressure supplied from a control valve (not shown). As shown in FIG. 4, stationary housing 139 has a supply port 185 for supplying the oil pressure. Supply port 185 is formed along the radial direction of stationary housing 139. The oil pressure supplied from the control valve to supply port 185 acts on piston 173.

In power train 125 configured as above, when an oil pressure is supplied to piston 173, clutch plates 168 and stationary plates 172 of hydraulic clutch mechanism 128 come into pressure contact with each other, thus causing the clutch to be "on" (the brake to be "on"). Thus, the rotation of first ring gear 133 of first planetary gear set 126 is prohibited.

A torque is inputted from hydraulic motor 124 to first sun gear 130 via input shaft 130A. The torque inputted to first sun gear 130 is transferred to first carrier 132 and first ring gear 133 via a plurality of first planetary gears 131. The torque transferred to first ring gear 133 is received by stationary housing 139 via hydraulic clutch mechanism 128.

The torque from first carrier 132 is inputted to second sun gear 135 via connecting shaft 150. The torque inputted to second sun gear 135 is transferred to second carrier 137 and second ring gear 138 via a plurality of second planetary gears 136. The torque transferred to second carrier 137 is transferred to wheel 190 via rotatable housing 144.

When the supply of oil pressure to piston 173 is stopped and the pressure oil is discharged, hydraulic clutch mechanism 128 is "off". When hydraulic clutch mechanism 128 is "off" (the brake is "off"), the rotation of first ring gear 133 of first planetary gear set 126 is permitted. At this time, due to free rotation of first ring gear 133, a torque inputted from hydraulic motor 124 would not be transferred to second sun gear 135. Thus, the torque is not transferred to wheel 190.

Next, advantageous effects of the present embodiment are described.

As shown in FIGS. 3 and 4, power train 125 in the embodiment includes first planetary gear set 126, second planetary gear set 127, and hydraulic clutch mechanism 128. Hydraulic clutch mechanism 128 is configured to permit or prohibit rotation of first ring gear 133 of first planetary gear set 126.

The torque inputted from hydraulic motor 124 (drive source) to power train 125 is amplified by first planetary gear set 126 and is then further amplified by second planetary gear set 127 to be outputted to the wheel. Hydraulic clutch mechanism 128 is attached to first ring gear 133 of first planetary gear set 126. Accordingly, hydraulic clutch mechanism 128 is acted on by the torque amplified by only first planetary gear set 126, i.e., the torque before being amplified by second planetary gear set 127. Hydraulic clutch mechanism 128 is not acted on by the torque amplified by second planetary gear set 127. Thus, the torque that acts on hydraulic clutch mechanism 128 is reduced.

The reduction in torque on hydraulic clutch mechanism 128 allows downsizing of hydraulic clutch mechanism 128, with reduced numbers of clutch plates 168 and stationary plates 172. Hydraulic clutch mechanism 128, which is reduced in diameter, can be disposed on the radially inner side relative to wheel bearings 142, 143. Thus, power train 125 can be reduced in weight.

A rotatable element of first planetary gear set 126 is coupled to stationary housing 139 via hydraulic clutch mechanism 128. When hydraulic clutch mechanism 128 is "on", the rotation of the rotatable element is braked. As shown in FIGS. 3 and 4, first planetary gear set 126 is disposed closer to hydraulic motor 124 than second planetary gear set 127 is to hydraulic motor 124. Thus, first planetary gear set 126 is disposed close to stationary housing 139 containing hydraulic motor 124. This eliminates the need to upsize stationary housing 139 in order to couple the clutch to a rotatable element remote from hydraulic motor 124. Therefore, stationary housing 139 can be downsized, and power train 125 can be further reduced in weight. Also, the design of power train 125 can be facilitated.

Further, as shown in FIGS. 3 and 4, second ring gear 138 of second planetary gear set 127 is fixed to stationary housing 139. Since the ring gear of the planetary gear set is fixed, the reduction gear ratio can be increased.

Further, as shown in FIGS. 3 and 4, rotatable housing 144, which is rotatable relative to stationary housing 139, is configured to rotate integrally only with second carrier 137 among the rotatable elements of first planetary gear set 126 and second planetary gear set 127. Of the planetary gear sets, second planetary gear set 127 is disposed remoter from hydraulic motor 124, on the vehicle-body outer side. Since only second carrier 137 is coupled to rotatable housing 144, the configuration of rotatable housing 144 can be simplified and the design of power train 125 can be facilitated.

Motor grader 1 in an embodiment includes left front wheel 2 and right front wheel 3 as shown in FIGS. 1 and 2. Motor grader 1 also includes power train 125 shown in FIGS. 3 and 4 configured to transfer power to left front wheel 2 and right front wheel 3. Thus, left front wheel 2 and right front wheel 3 of motor grader 1 can be reduced in weight.

It should be understood that the embodiment disclosed herein is illustrative in every respect, not limitative. The scope of the present invention is defined not by the above description but by the terms of the claims, and is intended to include any modification within the meaning and scope equivalent to the terms of the claims.

REFERENCE SIGNS LIST

1: motor grader; 2: left front wheel; 3: right front wheel; 4, 5: rear wheel; 6: engine; 7: hydraulic system; 12: all-wheel drive device; 13, 16: hydraulic pump; 14: left hydraulic motor; 15: right hydraulic motor; 50: blade; 51: front frame; 52: rear frame; 124: hydraulic motor; 124A: output shaft; 124B: main body; 125: power train; 126: first planetary gear set; 127: second planetary gear set; 128: hydraulic clutch mechanism; 130: first sun gear; 130A: input shaft; 131: first planetary gear; 132: first carrier; 132A, 133A, 138A: coupling portion; 133: first ring gear; 135: second sun gear; 136: second planetary gear; 137: second carrier; 138: second ring gear; 139: stationary housing; 142, 143: wheel bearing; 144: rotatable housing; 150: connecting shaft; 167: clutch input portion; 168: clutch plate; 169, 174: engagement portion; 171: pressure plate; 172: stationary plate; 173: piston; 182: bearing; 185: supply port; 190: wheel; 191: tire.

The invention claimed is:

1. A power train comprising:
   a drive source configured to generate a driving force;
   an input shaft configured to rotate by the driving force generated by the driving source;
   a first planetary gear set including
      a first rotatable element configured to rotate integrally with the input shaft, and
      a second rotatable element and a third rotatable element rotatable with rotation of the first rotatable element;
   a second planetary gear set including a fourth rotatable element configured to rotate integrally with the second rotatable element; and
   a clutch configured to permit or prohibit rotation of the third rotatable element.

2. The power train according to claim 1, wherein
   the first planetary gear set includes a sun gear, a planetary gear, a ring gear, and a carrier, and
   the third rotatable element is the ring gear of the first planetary gear set.

3. The power train according to claim 1, wherein the first planetary gear set is disposed closer to the drive source than the second planetary gear set is to the drive source.

4. The power train according to claim 1, wherein
   the second planetary gear set includes a sun gear, a planetary gear, a ring gear, and a carrier,
   the power train further comprises a housing containing the drive source, and
   the ring gear of the second planetary gear set is fixed to the housing.

5. The power train according to claim 1, wherein
   each of the first planetary gear set and the second planetary gear set includes a sun gear, a planetary gear, a ring gear, and a carrier,
   the power train further comprises
      a housing containing the drive source, and
      a rotatable housing rotatable relative to the housing, and
   the rotatable housing is configured to rotate integrally only with the carrier of the second planetary gear set, among rotatable elements included in the first planetary gear set and the second planetary gear set.

6. A construction machine comprising:
   a wheel; and
   the power train according to claim 1, wherein
      each of the first planetary gear set and the second planetary gear set includes a sun gear, a planetary gear, a ring gear, and a carrier, and
      the wheel is configured to rotate integrally only with the carrier of the second planetary gear set, among rotatable elements included in the first planetary gear set and the second planetary gear set.

* * * * *